US005282519A

United States Patent [19]

Venturo et al.

[11] Patent Number: 5,282,519

[45] Date of Patent: Feb. 1, 1994

[54] COMBINED SAWHORSE AND TOOLBOX APPARATUS

[76] Inventors: Frank J. Venturo, 611 Winding Hollow Dr., Franklin Lakes, N.J. 07417; Victor F. Venturo, 6111 Park Ave. 1-A, West New York, N.J. 07093

[21] Appl. No.: 31,321

[22] Filed: Mar. 15, 1993

[51] Int. Cl.[5] .............................................. F16M 11/00

[52] U.S. Cl. .................................... 182/181; 182/129; 182/151

[58] Field of Search ................................ 182/181-186, 182/224-227, 129, 151; 312/235.2; 206/216, 372, 373

[56] References Cited

U.S. PATENT DOCUMENTS

| | | | |
|---|---|---|---|
| 1,470,166 | 10/1923 | Holland | 206/373 X |
| 1,867,347 | 7/1932 | Blair | 206/373 X |
| 2,094,805 | 10/1937 | Meier | 206/373 X |
| 3,092,428 | 6/1963 | Kerschner | 206/373 X |
| 3,293,602 | 12/1966 | Viviano | 182/186 X |
| 3,851,756 | 12/1974 | Brown | 206/216 |
| 4,303,158 | 12/1981 | Perkins | 206/373 |
| 4,596,308 | 6/1986 | Auerbach | 182/181 X |
| 5,148,917 | 9/1992 | Lebrun | 206/373 X |

*Primary Examiner*—Alvin C. Chin-shue
*Attorney, Agent, or Firm*—Leon Gilden

[57] ABSTRACT

A housing having a top wall, including a plurality of handle slots directed therethrough is arranged for ease of transport of the top wall and the associated housing, wherein the housing further includes respective first and second trapezoidal end walls, with the second end wall including a plurality of wheel members mounted thereon for ease of transport of the organization upon pivoting the housing onto the second end wall. The housing includes a floor spaced from a lowermost periphery of the housing, with leg members received within sockets positioned at each intersection of each end wall with each side wall of the housing structure. The second side wall structure includes a second side wall portion pivotally mounted to a lowermost side wall portion, that in turn is hingedly mounted to the top wall to provide access within the housing for storage.

1 Claim, 4 Drawing Sheets

COMBINED SAWHORSE AND TOOLBOX APPARATUS

BACKGROUND OF THE INVENTION

1. Field of the Invention

The field of invention relates to woodworking apparatus, and more particularly pertains to a new and improved combined sawhorse and toolbox apparatus wherein the same is arranged to direct a compact and readily transported organization for use in a woodworking procedure.

2. Description of the Prior Art

Various sawhorse and toolbox structure is available in the prior art such as indicated in U.S. Pat. No. 3,851,756, wherein the sawhorse structure includes pivotally mounted legs mounted to a bottom wall of the toolbox.

U.S. Pat. Nos. 4,744,613; 4,763,757; and 4,014,404 are further examples of sawhorse structure.

The instant invention attempts to overcome deficiencies of the prior art by providing for a substantial sawhorse member providing for an elongate top wall permitting the top wall for use and support of various workpieces, as well as the storage of tools and the like therewithin for ease of transport of the organization and in this respect, the present invention substantially fulfills this need.

SUMMARY OF THE INVENTION

In view of the foregoing disadvantages inherent in the known types of sawhorse structure now present in the prior art, the present invention provides a combined sawhorse and toolbox apparatus wherein the same is directed to the positioning of a toolbox having socket members to receive legs mounted within the toolbox during transport thereof. As such, the general purpose of the present invention, which will be described subsequently in greater detail, is to provide a new and improved combined sawhorse and toolbox apparatus which has all the advantages of the prior art sawhorse apparatus and none of the disadvantages.

To attain this, the present invention provides a housing having a top wall, including a plurality of handle slots directed therethrough and arranged for ease of transport of the top wall and the associated housing, wherein the housing further includes respective first and second trapezoidal end walls, with the second end wall including a plurality of wheel members mounted thereon for ease of transport of the organization upon pivoting of the housing onto the second end wall. The housing includes a floor spaced from a lowermost periphery of the housing, with leg members received within sockets positioned at each intersection of each end wall with each side wall of the housing structure. The second side wall structure includes a second side wall portion pivotally mounted to a lowermost side wall portion, that in turn is hingedly mounted to the top wall to provide access within the housing for storage.

My invention resides not in any one of these features per se, but rather in the particular combination of all of the herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combined sawhorse and toolbox apparatus which has all the advantages of the prior art sawhorse apparatus and none of the disadvantages.

It is another object of the present invention to provide a new and improved combined sawhorse and toolbox apparatus which may be easily and efficiently manufactured and marketed.

It is a further object of the present invention to provide a new and improved combined sawhorse and toolbox apparatus which is of a durable and reliable construction.

An even further object of the present invention is to provide a new and improved combined sawhorse and toolbox apparatus which is susceptible of a low cost of manufacture with regard to both materials and labor, and which accordingly is then susceptible of low prices of sale to the consuming public, thereby making such combined sawhorse and toolbox apparatus economically available to the buying public.

Still yet another object of the present invention is to provide a new and improved combined sawhorse and toolbox apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
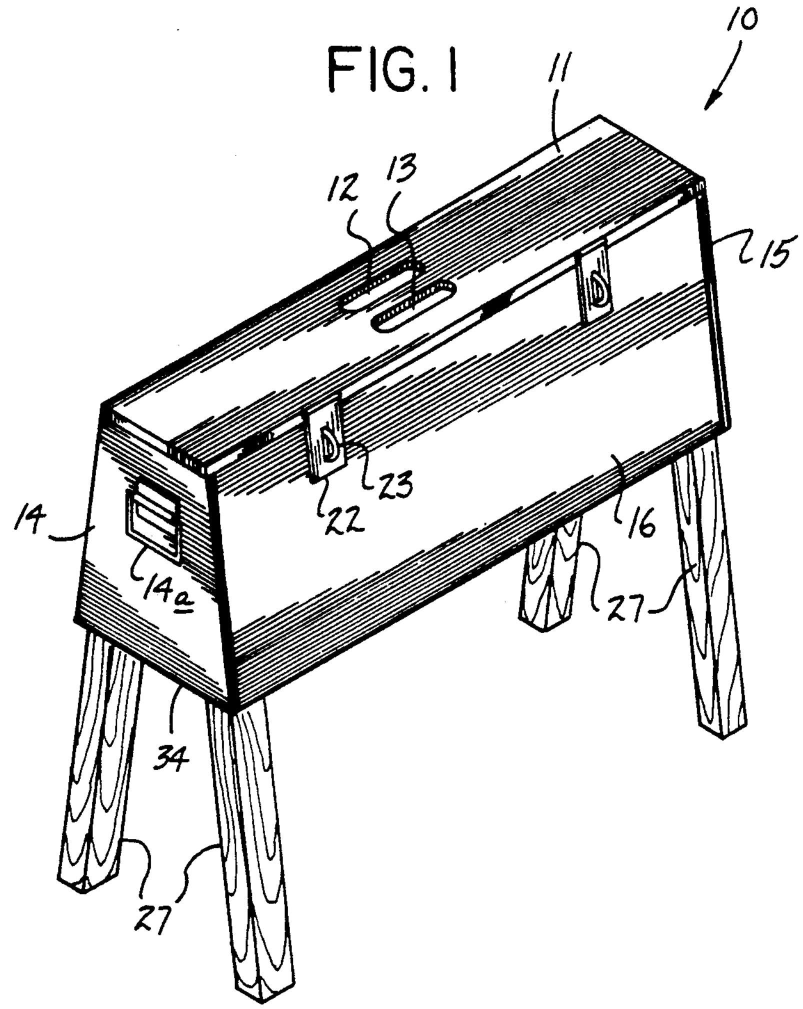
FIG. 1 is an isometric illustration of the invention.

With reference now to the drawings, and in particular to FIGS. 1 to 8 thereof, a new and improved combined sawhorse and toolbox apparatus embodying the principles and concepts of the present invention and generally designated by the reference numeral 10 will be described.

Figure 3:
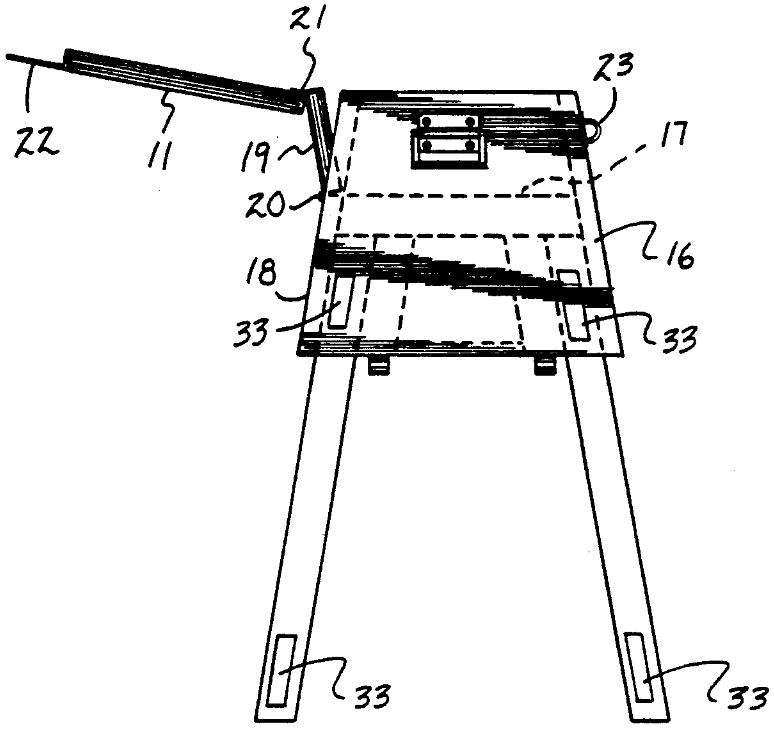
FIG. 3 is an orthographic end view of the invention indicating the lid structure separated relative to the toolbox housing.
Figure 4:
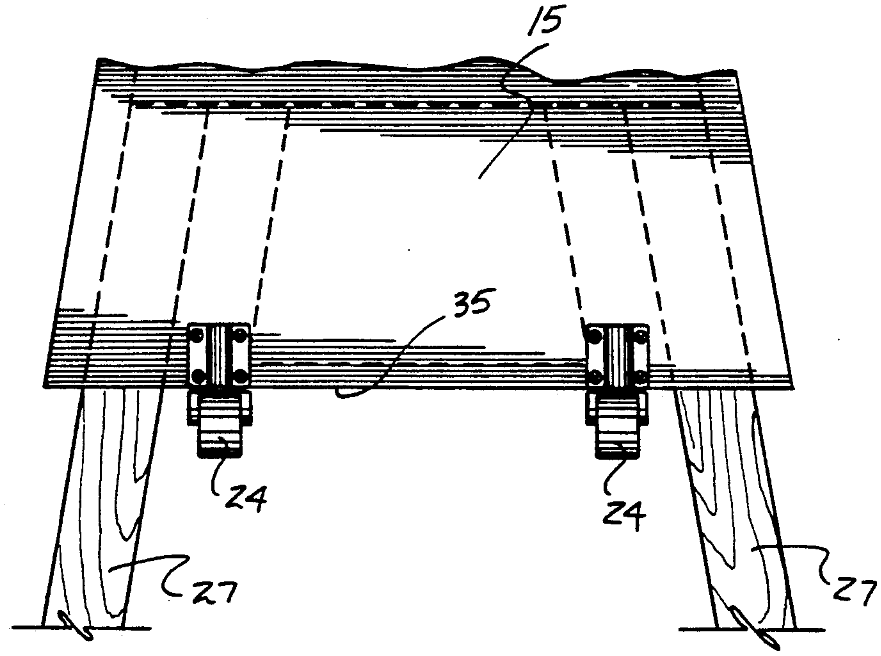
FIG. 4 is an orthographic partial end view of the second end wall mounting the caster wheels thereon.

More specifically, the combined sawhorse and toolbox apparatus 10 of the instant invention essentially comprises a toolbox housing, as indicated in FIG. 1, having a top wall 11 that includes directed therethrough, a plurality of respective first and second handle slots 12 and 13 arranged in a parallel coextensive relationship relative to one another medially of the top wall permitting grasping of the intermediate bar portion between the slots 12 and 13 of the handle. Respective first and second trapezoidal end walls 14 and 15 are arranged in a parallel coextensive relationship spaced apart a predetermined length, with a first side wall 16 extending orthogonally and between the first and second end walls 14 and 15 extending to the top wall 11. A floor plate 17 mounted orthogonally between the first and second end walls 14 and 15 is spaced above a lower periphery of the housing, that includes respective first and second end wall lowermost ends 34 and 35. A second side wall first plate 18 extends from the housing periphery to the floor plate 17, with a second side wall second plate 19 hingedly mounting the second side wall first plate 18 about a first hinge 20, as indicated in FIG. 3, with a second hinge 21 hingedly mounting the second side wall second plate 19 to the top wall 11. The top wall includes a plurality of hasp plates 22 mounted to the top wall for receiving within each hasp plate 22 a latch plate loop 23, in a manner as indicated in FIG. 1, to permit latching of the top wall to the first side wall 16. A plurality of caster wheel members 24 are mounted to the second end wall, and more specifically, project beyond and below the second end wall lowermost end 35. In this manner, the wheels are free for rotation, whereupon pivoting of the housing upon the second end wall permits ease of mobility and transport of the organization upon an underlying support surface.

Figure 7:
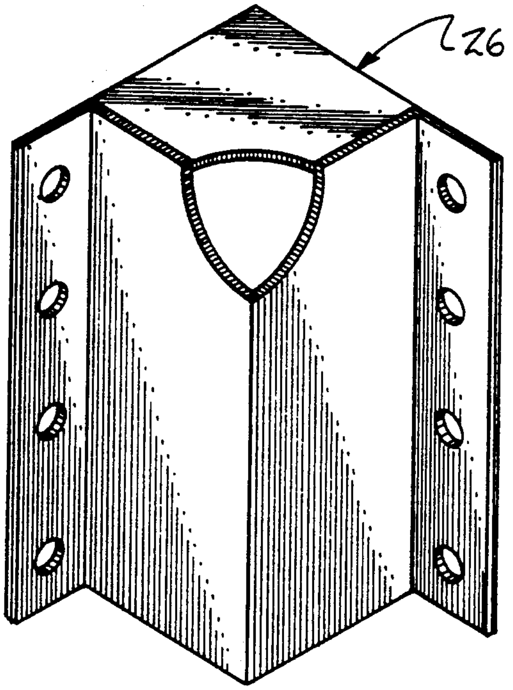
FIG. 7 is an isometric illustration of the socket housing employed at each intersection of the housing floor relative to each side and end wall junction.
Figure 8:
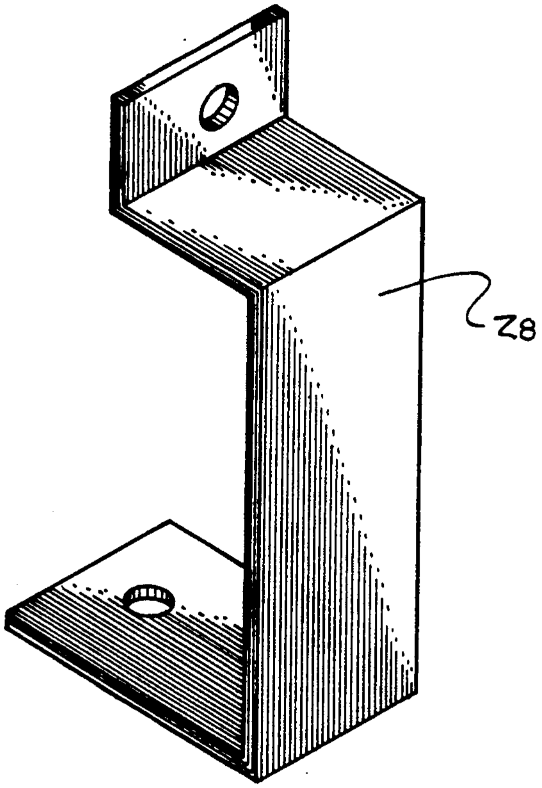
FIG. 8 is an isometric illustration of the metallic loops optionally employed mounted to the side walls for support of the leg members therewithin.

Within the housing at each junction of the side walls with the end walls extending from the floor 17 to the lowermost periphery is a socket housing 26, of a type as indicated in FIG. 7, defining a leg socket 25 to receive a support leg 27 therewithin. The support legs are slidably mounted within the leg sockets 25 and are easily removed therefrom during compact storage of the organization. The legs 27 are each of a predetermined second length less than the first length for storage within the housing, as required.

Figure 5:
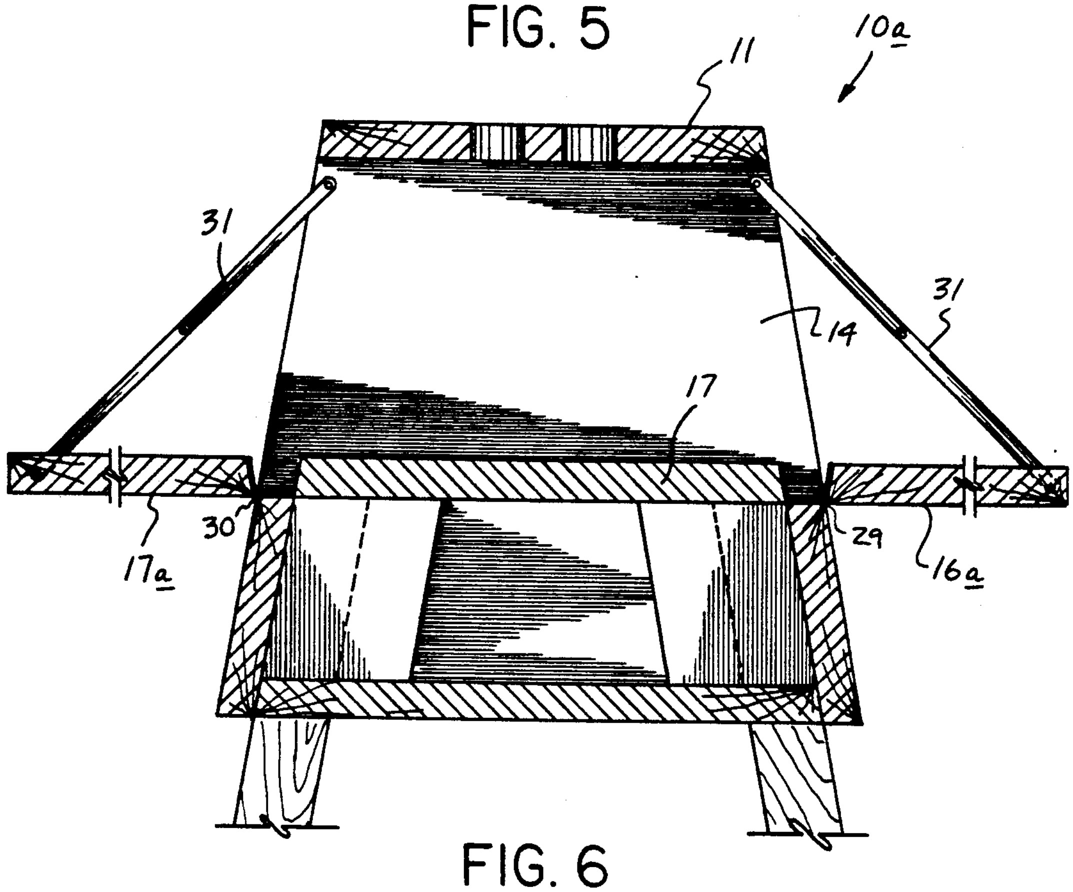
FIG. 5 is an orthographic cross-sectional illustration of a modified housing structure employing pivotally mounted side walls relative to a fixed top wall.
Figure 6:
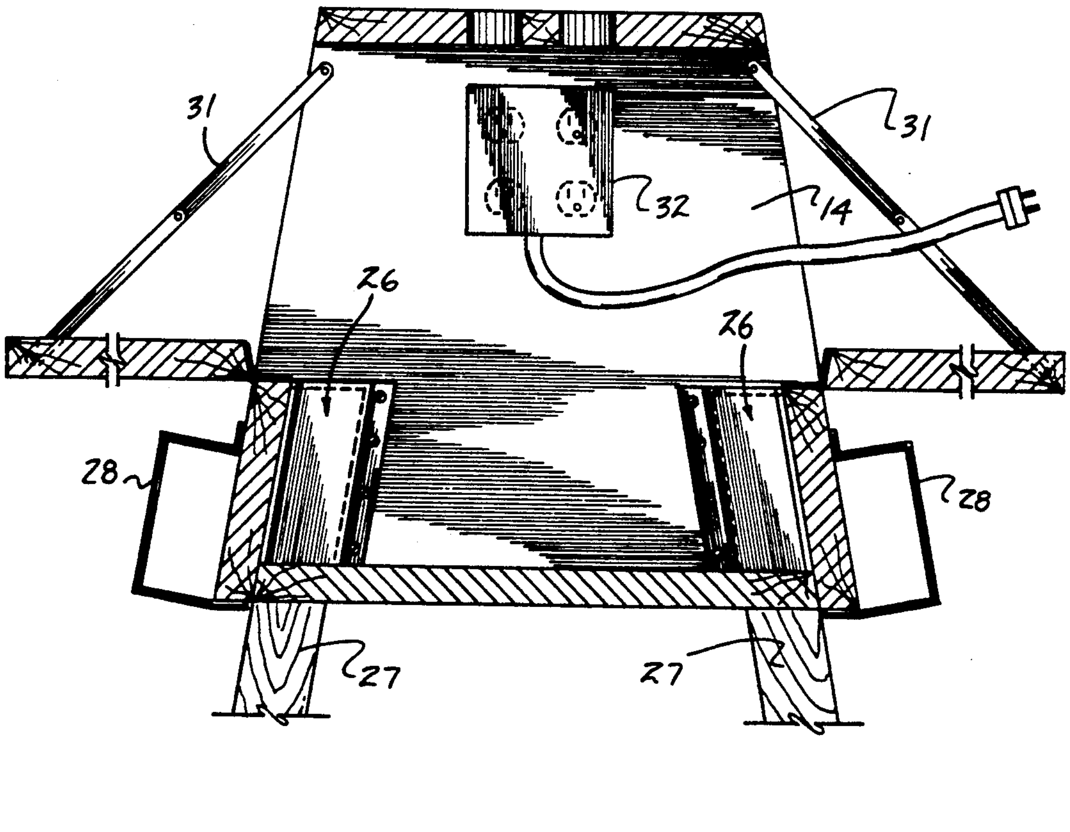
FIG. 6 is an orthographic end view of the invention, as indicated in FIG. 5, employing an electrical outlet member therewithin.

The apparatus 10a, as indicated in FIGS. 5 and 6, indicates the use of the top wall 11 fixedly mounted between the first and second end walls 14 and 15, having first and second side wall portions 16a and 17a hingedly mounted about respective first and second side wall hinges 29 and 30 relative to the floor 17. Further, if desired, electrical outlet box 32 may be mounted within the housing for convenience of applying power to a multitude of conventional electrically powered woodworking tools.

Figure 2:
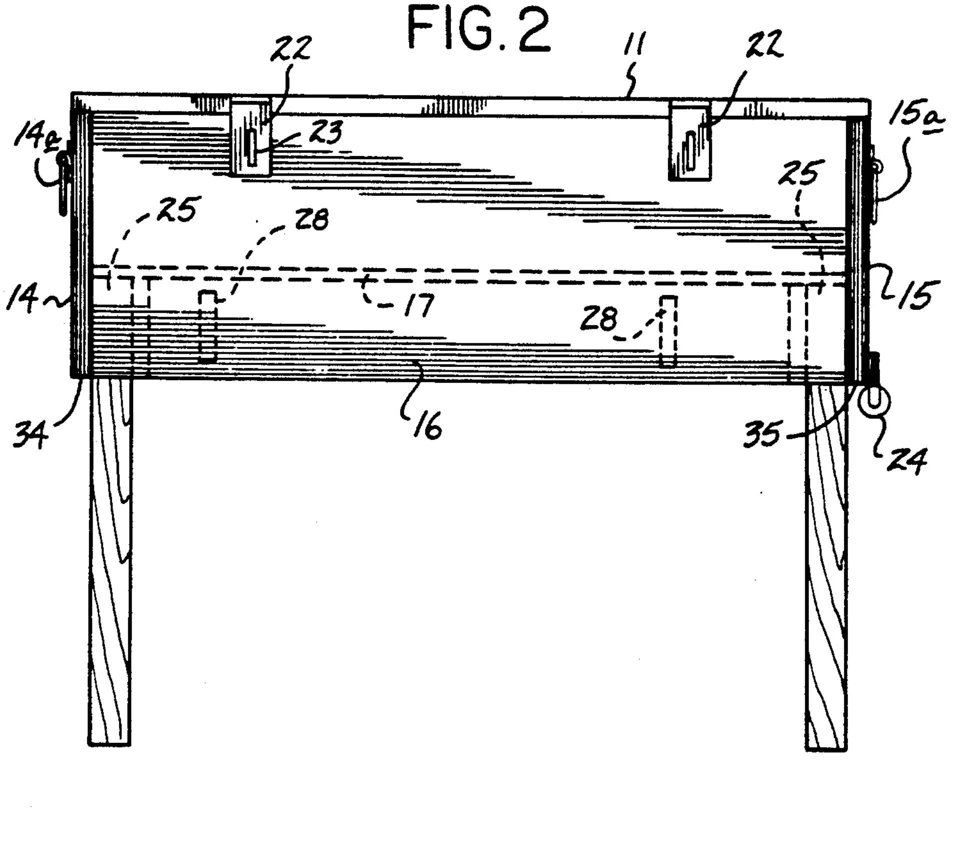
FIG. 2 is an orthographic side view of the invention.

Further, a plurality of ferrous metallic loops 28 are mounted to each, or at least to one of the side walls, wherein the support legs 27 may include a plurality of spaced bar magnets 33, as indicated in FIG. 3, for adherence to the ferrous metallic loops when the tool housing, upon storage of various woodworking components therewithin, does not provide for ample remaining room for the support legs 27, wherein in such a case, the support legs may be mounted within spaced metallic loops 28, of a type as indicated in FIG. 6, and indicated in phantom in FIG. 2. Accordingly, the bar magnets are spaced apart a predetermined spacing equal to a predetermined spacing spaced apart by the loops 28.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A combined sawhorse and toolbox apparatus, comprising,
   - a toolbox housing, having a top wall spaced from a floor plate, and a first end wall spaced from a second end wall, and
   - the toolbox housing having a lowermost continuous periphery spaced an equal distance relative to the top wall, with the floor plate oriented between the lowermost periphery and the top wall, and
   - a first side wall extending coextensively between the first end wall and the second end wall, and
   - a second side wall first plate extending from the lowermost periphery to the floor plate, and
   - a second side wall second plate extending from the second side wall first plate to the top wall, and a first hinge pivotally mounting the second side wall first plate to the second side wall second plate, and a second hinge pivotally mounting the second side wall second plate to the top wall, and a plurality of socket housings mounted to each of said first end wall and said second end wall extending from the lowermost periphery to the floor plate, with each of the socket housings defining a leg socket, and a support leg of a plurality of support legs received within one of said leg sockets, and the first end wall spaced from the second end wall a predetermined first length, and each of the support legs having a second predetermined length less than said first predetermined length permitting reception of each of the support legs within the toolbox housing, and the top wall includes at least one hasp plate pivotally mounted to the top wall, and the first side wall includes at least one latch plate loop, wherein the latch plate loop is arranged for reception to the hasp plate when the top wall is mounted in contiguous communication to the first end wall and the second end wall, and the second end wall includes a plurality of caster wheel members mounted to the second end wall extending beyond the continuous periphery, and the top wall includes a plurality of handle slots oriented intermediate the first end wall and the second end wall, having a handle rib oriented between the slots for manual grasping of the toolbox housing, and the first side wall includes a plurality of ferrous metallic loops mounted to the first side wall adjacent the continuous periphery spaced apart a predetermined spacing, and wherein each of the support legs includes a plurality of bar magnets spaced apart said predetermined spacing arranged for magnetic adherence to the ferrous metallic loops when the support legs are positioned within the ferrous metallic loops.

* * * * *